(12) United States Patent
Lee et al.

(10) Patent No.: US 12,548,609 B2
(45) Date of Patent: Feb. 10, 2026

(54) FEED-FORWARD DATA TOGGLING BASED DELAY CIRCUIT

(71) Applicant: Sandisk Technologies, Inc., Milpitas, CA (US)

(72) Inventors: Jang Woo Lee, San Ramon, CA (US); Venkatesh Ramachandra, San Jose, CA (US); Siddhesh Darne, Milpitas, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 199 days.

(21) Appl. No.: 18/425,850

(22) Filed: Jan. 29, 2024

(65) Prior Publication Data
US 2025/0246218 A1 Jul. 31, 2025

(51) Int. Cl.
*G11C 7/22* (2006.01)
*G11C 7/10* (2006.01)

(52) U.S. Cl.
CPC ............ *G11C 7/222* (2013.01); *G11C 7/1057* (2013.01); *G11C 7/1066* (2013.01)

(58) Field of Classification Search
CPC .................................. G11C 7/222; G11C 7/22
USPC ....................................................... 365/233.1
See application file for complete search history.

(56) References Cited

U.S. PATENT DOCUMENTS

| | | | |
|---|---|---|---|
| 1,021,497 A | 3/1912 | Woodruff | |
| 6,292,521 B1 * | 9/2001 | Lai | ........................ H04L 7/0338 375/357 |
| 6,987,408 B2 | 1/2006 | Kim | |
| 7,818,601 B2 | 10/2010 | LaBerge | |
| 9,218,575 B2 | 12/2015 | Mozak et al. | |
| 2002/0196883 A1 * | 12/2002 | Best | ....................... H03L 7/0814 375/355 |
| 2005/0047192 A1 * | 3/2005 | Matsui | ................ G06F 13/4243 365/145 |
| 2007/0217559 A1 * | 9/2007 | Stott | ...................... H04L 7/0008 375/355 |
| 2015/0106538 A1 * | 4/2015 | Vasudevan | ............. G06F 3/0655 710/74 |
| 2016/0162404 A1 * | 6/2016 | Lee | ........................ G11C 29/028 711/120 |
| 2018/0137901 A1 * | 5/2018 | Jung | ....................... G11C 7/222 |
| 2023/0253969 A1 | 8/2023 | Tang | |

FOREIGN PATENT DOCUMENTS

JP 4945616 A 12/2009

OTHER PUBLICATIONS

Nikolic, Borivoje, et al., "Improved Sense-Amplifier-Based Flip-Flop: Design and Measurements," IEEE Journal of Solid-State Circuits, vol. 35, No. 6, Jun. 2000, 9 pages.*

* cited by examiner

*Primary Examiner* — Muna A Techane
(74) *Attorney, Agent, or Firm* — Pearl Cohen Zedek Latzer Baratz LLP

(57) ABSTRACT

Technology for data dependent control of a delay between a data strobe signal and data signals. The delay may be adjusted to compensate for data dependent impacts on propagation delays in an unmatched data in path and data strobe path. The delay between the data strobe signal and data signals may be adjusted based on a number of toggles in data to be sent to a memory die.

20 Claims, 10 Drawing Sheets

FIG. 9A

| | 904 | | | 900 | | | | 902 | | Toggles |
|---|---|---|---|---|---|---|---|---|---|---|
| DQ7 | 1 | 1 | 1 | 0 | 1 | 1 | 1 | 1 | 1 | 2 |
| DQ6 | 1 | 0 | 0 | 0 | 0 | 0 | 0 | 0 | 1 | 2 |
| DQ5 | 0 | 0 | 0 | 0 | 0 | 0 | 0 | 0 | 0 | 0 |
| DQ4 | 1 | 1 | 0 | 1 | 1 | 1 | 1 | 1 | 1 | 2 |
| DQ3 | 1 | 1 | 1 | 0 | 1 | 1 | 1 | 1 | 1 | 2 |
| DQ2 | 1 | 0 | 0 | 0 | 0 | 0 | 0 | 0 | 1 | 2 |
| DQ1 | 0 | 0 | 0 | 0 | 0 | 0 | 0 | 0 | 0 | 0 |
| DQ0 | 1 | 1 | 0 | 1 | 1 | 1 | 1 | 1 | 1 | 2 |
| | | | | | | | | | | 12 |

FIG. 9B

| | 954 | | | 950 | | | | 952 | | Toggles |
|---|---|---|---|---|---|---|---|---|---|---|
| DQ7 | 1 | 0 | 1 | 0 | 1 | 0 | 1 | 0 | 1 | 8 |
| DQ6 | 0 | 1 | 0 | 1 | 0 | 1 | 0 | 1 | 0 | 8 |
| DQ5 | 1 | 0 | 1 | 0 | 1 | 0 | 1 | 0 | 1 | 8 |
| DQ4 | 0 | 1 | 0 | 1 | 0 | 1 | 0 | 1 | 0 | 8 |
| DQ3 | 0 | 1 | 0 | 1 | 0 | 1 | 0 | 1 | 0 | 8 |
| DQ2 | 1 | 0 | 1 | 0 | 1 | 0 | 1 | 0 | 1 | 8 |
| DQ1 | 0 | 1 | 0 | 1 | 0 | 1 | 0 | 1 | 0 | 8 |
| DQ0 | 1 | 0 | 1 | 0 | 1 | 0 | 1 | 0 | 1 | 8 |
| | | | | | | | | | | 64 |

FEED-FORWARD DATA TOGGLING BASED DELAY CIRCUIT

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A typical memory system contains a memory controller and a number of semiconductor dies ("memory dies") that contain memory cells that store data. The memory controller typically interfaces with a host device that sends read and write commands. The memory controller oversees the writing of the host data to the various memory dies, as well as reading back the host data. FIG. 1 depicts a conventional interface 10 between a memory controller 20 and a memory die 30. The memory system may have additional memory dies 30, but they are not depicted in FIG. 1. The interface 10 has a number of signals that are transferred over a bus that connects the memory controller 20 with the memory die 30. The example signals include a chip enable signal CEn, an address latch enable signal ALE, a command latch enable signal CLE, a write enable signal WEn, a read enable signal REn/BREn, a data strobe signal DQS/BDQS, and an input/output signal DQ[n:0].

The signal CEn enables the memory die 30 and is asserted (or active) at a low level. The signal CLE is used to indicate that the I/O signals DQ[n:0] specify a command. The signal ALE is used to indicate that the I/O signals DQ[n:0] specify an address. The signal WEn is used to import the command or the address at transition timing from the low level to a high level. The signal REn is active low and is used to read from the memory die 30. The signal BREn is a complementary signal of the signal REn.

The input/output DQ[n:0] may contain a command, an address, data transmitted to the memory die 30 for a write, or data transmitted from the memory die 30 for a read, depending on the present usage.

The signal DQS and a complementary signal BDQS of the signal DQS are output from a transmitting side together with the I/O signal. During write the memory controller 20 transmits DQS/BDQS. During read the memory die 30 transmits DQS/BDQS. A data receiving side receives the transmitted signals DQS and BDQS. The signal DQS/BDQS may be referred to as a data strobe and is used by the receiving side to adjust timing with respect to the data being received on DQ[n:0].

A write training process may be used to calibrate delays between the clock signal DQS and the data signals DQ[n:0], which helps to provide a wider data valid window. The write training process typically includes trying a number of different delays between the clock signal and the data signals. A data valid window 220 is depicted in FIG. 2. The arrows 230 below the data eye diagram 210 correspond to different delays between DQS and DQ (for one data path). Arrows labeled with a "P" indicate "pass" or that data was validly received for that delay. Arrows labeled with a "F" indicate "fail" or that data was not validly received for that delay. The shortest delay is on the left, with the delays getting progressively longer moving to the right. Hence, there is a range of delays for which data was validly received. The range includes a shortest delay 230a for which data was validly received, and a longest delay 230b for which data was validly received.

The memory controller 20 may set delay values for each data line based on the shortest delay 230a and the longest delay 230b. However, changes can occur in real-time that impact the delay between the clock signal and the data signals. Therefore, the write training process cannot compensate for these real time changes in delay.

In general, a signal, such as the clock signal DQS and the data signals DQ may be at a level at a given point in time. As used herein, a level of a signal is a magnitude value, such as a voltage magnitude value or a current magnitude value. In some cases, the signal may be referred to as being at a high level or at a low level, transitioning between a high level and a low level, or transitioning between a low level and a high level.

With reference to FIG. 3A, a high level of a signal is a level that is at or above a minimum high level $V_{H\_MIN}$, and a low level of the signal is a level that is at or below a maximum low level $V_{L\_MAX}$. The minimum high level $V_{H\_MIN}$ and the maximum low level $V_{L\_MIN}$ may be predetermined levels or values, and in particular example configurations, predetermined levels or values specified as part of a swing requirement with which the transmitting circuit is configured to comply when transmitting the signal. A signal that transitions according to and/or in compliance with the swing requirement transitions to a high level that is at or above the minimum high level $V_{H\_MIN}$ of the swing requirement, and transitions to a low level that is at or below the maximum low level $V_{L\_MAX}$ of the swing requirement.

In general, a signal performs transitions between its high level and its low level. A given transition of a signal may be one of two transition types, including a rising transition and a falling transition. A signal performs a rising transition when the signal transitions from its low level to its high level, and performs a falling transition when the signal transitions from its high level to its low level.

A portion of a magnitude waveform of a signal over a transition is referred to as an edge. In particular, a portion of the magnitude waveform over a rising transition is a rising edge and a portion of the magnitude waveform over a falling transition is a falling edge.

Also, a clock signal, such as the input clock signal DQS, is a signal that has repetitive cycles occurring over successive periods T. Within a cycle, one of the portions is at a high level and the other portion is at a low level. Accordingly, the portions may be defined by consecutive rising and falling transitions or edges of the clock signal. For example, a given rising edge or a given falling edge may define or mark a boundary when one portion ends and a next portion, either of the same cycle or of a next cycle, begins.

In addition, a clock signal may include clock pulses that are formed or defined by the rising and falling edges of the clock signal. In particular example configurations, the clock pulses of a clock signal correspond to the high level of the clock signal, in that each clock pulse is defined by a rising edge followed by a period where the clock signal is at its high level, and then followed by a falling edge. A pulse width of a given clock pulse is a time duration extending from a time that the magnitude of the rising edge of the clock pulse is at or rises to a predetermined level (e.g., 50% of the high level) to a time that the magnitude of the falling edge of the clock pulse is at or falls to the predetermined level. The clock pulses of the clock signal may occur according to the frequency of the clock signal.

Additionally, a data signal is a signal that carries and/or includes data. The data carried by and/or included in a data signal includes a sequence of bits, where each bit includes or has a single-bit logic value of "1" or "0". The data signal may include a series or sequence of data pulses corresponding to a bit sequence of the data. Each data pulse may be at a level that indicates a data value, otherwise referred to as a logic level or a logic value. In addition, each data value is represented by a binary number or a binary value that includes one or more digits corresponding to and/or representing the one or more bits of the bit sequence. A duration of a data pulse is an amount of time that the level of the data pulse indicates the data value that the data pulse represents.

FIG. 3B is a schematic diagram illustrating setup time and hold time requirements. A sampling transition of the clock signal DQS is shown as occurring at a clock event time tce. An occurrence of a sampling transition of the clock signal CLK may be referred to as a clock event. When the sampling circuit detects a sampling transition, it detects a clock event. A time duration from a first time t1 to the clock event time tce denotes the setup time tDS, and a time duration from the clock event time tce to a second time denotes the hold time tDH. In order to meet the setup and hold requirements of a sampling circuit, the level of a data pulse of the input data signal DIN should be stable from the first time t1 to the second time t2. A setup violation occurs when the level of input data signal DIN is unstable (it is still changing) after the first time t1 occurs. In other words, a setup violation occurs when the actual amount of time that the level of the input data signal DIN is stable before occurrence of the sampling transition at the clock event time tce is less than the amount of the setup time tDS. In addition, a hold violation occurs when the level of the input data signal DIN is unstable (it changes) before the second time t2. In other words, a hold violation occurs when the actual amount of time that the level of the input data signal DIN is stable after occurrence of the sampling transition at the clock event time tce is less than the amount of the hold time tDH.

For a data pulse of the input data signal DIN, at least a portion of the duration that a level of the data pulse is stable—e.g., at least a portion of the duration that the data pulse is at the high level or at the low level—defines a data valid window $T_{DVW}$. A data valid window $T_{DVW}$ is a time period or duration over which a given data pulse occurs during which a sampling circuit is to detect a sampling transition of the clock signal in order to avoid a setup violation and a hold violation. If the sampling transition occurs before the start of the data valid window $T_{DVW}$, then a setup violation occurs—either because the sampling transition occurred before the starting transition of the data pulse, or because the sampling transition occurred too close to after the starting transition that the actual amount of time that the level of the data pulse is stable before occurrence of the sampling transition is less than the setup time tDS. In addition, if the sampling transition occurs after the end of the data valid window $T_{DVW}$, then a hold violation occurs—either because the sampling transition occurred after the ending transition of the data pulse or occurred too close to before the ending transition that the actual amount of time that the level of the data pulse is stable after occurrence of the sampling transition is less than the hold time tDH.

Ideally, the sampling circuit receives the clock signal DQS and the input data signal DIN relative to each other such that the sampling circuit reliably or accurately samples the level of each data pulse in order to correctly identify the data value that each data pulse represents. Configuring the sampling circuit to sample each data pulse in the middle or at a middle point of the duration of each pulse may maximize the chances of this ideal situation occurring. The ideal time at which to sample a data pulse is referred to as a target sampling time of the data pulse. Ideally, the sampling circuit identifies sampling transitions in the middle of the durations of the data pulses and/or at the target sampling times of the data pulses. Accordingly, a given sampling transition is in a target sampling position when the sampling transition occurs at the target sampling time of its associated data pulse.

FIG. 3C shows a data pulse of the input data signal DQ and a pulse of the clock signal DQS, illustrating the ideal case where a sampling transition of the clock pulse is in the target sampling position. In FIG. 3C, a starting transition of the data pulse occurs at a first time t1, and an ending transition of the data pulse occurs at a second time t2. A target sampling time tt of the data pulse occurs in the middle between the first time t1 and the second time t2. Accordingly, a first time period T1 extending from the first time t1 to the target sampling time tt is the same as or equal to a second time period T2 extending from the target sampling time tt to the second time t2. Additionally, the sampling transition associated with the data pulse is the rising transition of the clock pulse. The sampling transition occurs at a sampling time ts. In FIG. 3C, for the ideal case, the sampling transition occurs at the target sampling time—i.e., the sampling time ts and the target sampling time tt are the same.

In actuality, when the transmitting circuit sends the data signals DQ and the clock signal DQS to the receiving circuit, the sampling circuitry of the receiving circuit may not receive the clock pulses in their respective target sampling positions. For a given sampling circuit that samples data pulses of an input data signal in response to sampling transitions of a clock signal, where the sampling transitions occur at times different than the target sampling times tt, the input data signal and the clock signal have skew between them. In general, as used herein, skew between a clock signal and a data signal is a deviation of a sampling transition of the clock signal from a target sampling position to sample a data pulse of the data signal. In addition, with respect to sampling times, skew between a clock signal and a data signal is a deviation of a sampling time ts from a target sampling time tt to sample a data pulse of a data signal. For a given pair of clock and data signals, where the clock signal performs sampling transitions at sampling times ts that match or occur at the same times as the target sampling times tt, the clock and data signals do not have skew between them. Alternatively, where the clock signal performs sampling transitions at sampling times ts different than the target sampling times tt (i.e., before or after the target sampling times tt), the clock and data signals have skew between them. An amount of skew (or skew amount) may be quantified by the difference in time between the sampling time ts and the target sampling time tt.

BRIEF DESCRIPTION OF THE DRAWINGS

Like-numbered elements refer to common components in the different Figures.

FIGS. 9A and 9B depict tables to show examples of how toggling in the data may correlate to power consumption.

DETAILED DESCRIPTION

Technology is disclosed herein for data dependent control of a delay between a data strobe signal and data signals. The delay may be adjusted to compensate for data dependent impacts on propagation delays in a data in path and a data strobe path. In an embodiment, the data strobe path and the data in path are unmatched. Changes in the power level may change the delay in the data strobe path to a different extent than the data in path. An embodiment of a feed-forward delay controller adjusts the delay based on a number of toggles in data to be sent to a memory die. Adjusting the delay between the data strobe signal and the data signals compensates for such data dependent changes in propagation delay, thereby keeping the data strobe signal within a valid data window.

Figure 1:
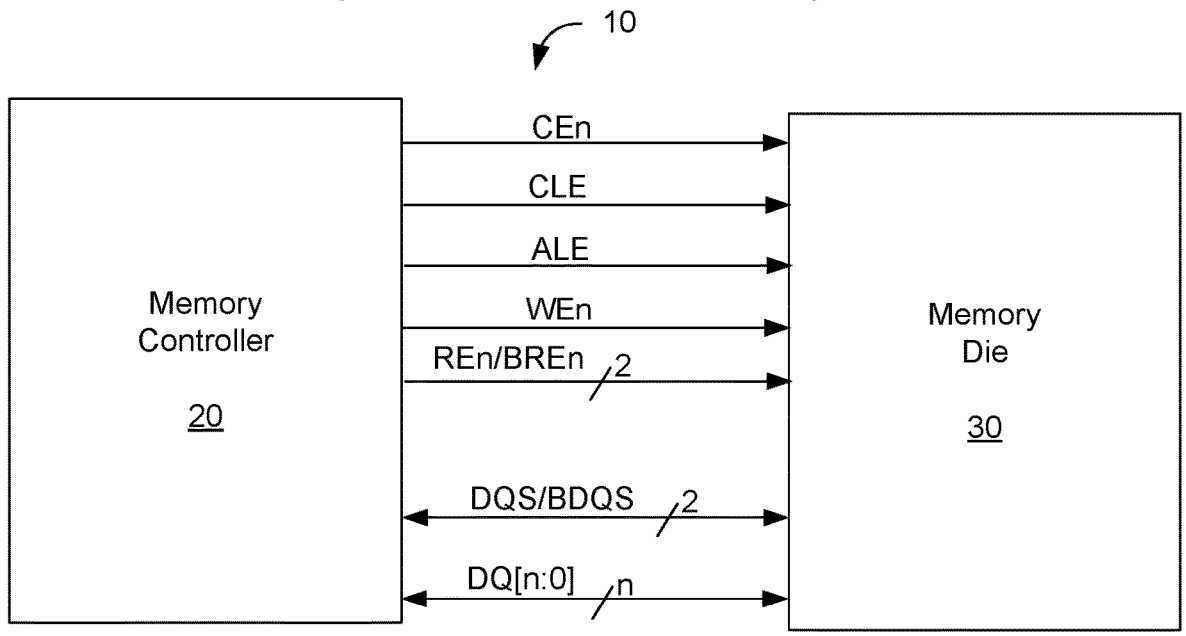
FIG. 1 depicts a conventional interface between a memory controller and a memory die.
Figure 2:
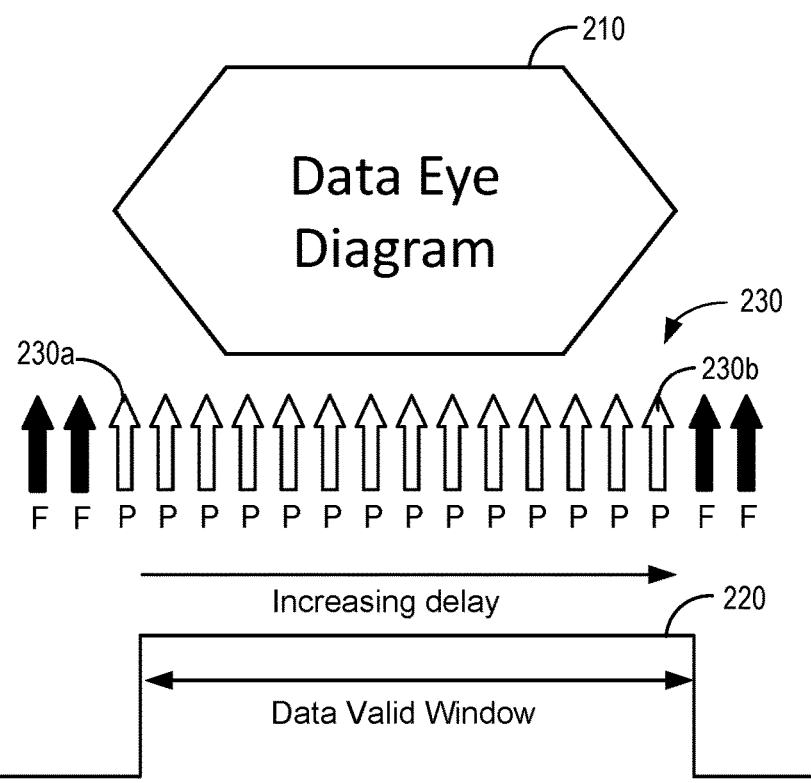
FIG. 2 shows a data eye diagram and corresponding data valid window.
Figure 3A:
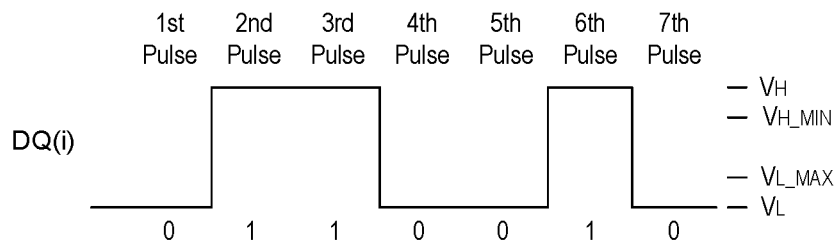
FIG. 3A depicts an example data signal.
Figure 3B:
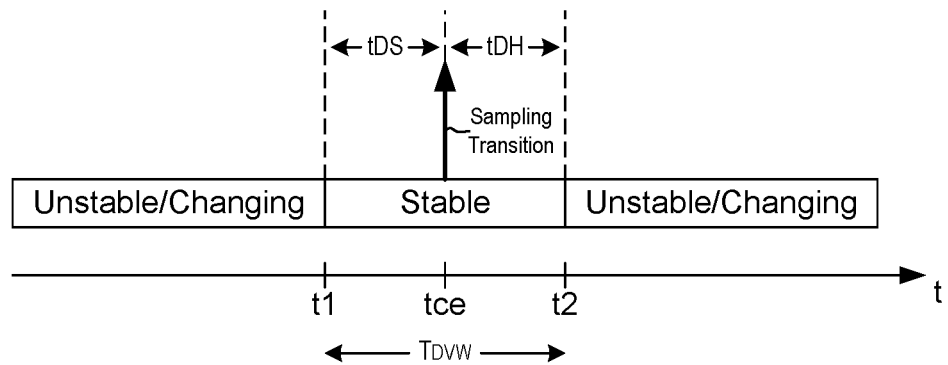
FIG. 3B is a schematic diagram illustrating setup time and hold time requirements.
Figure 3C:
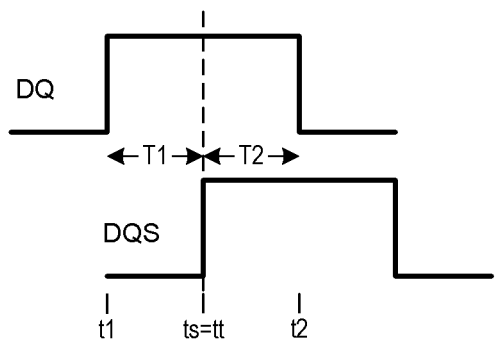
FIG. 3C shows a data pulse of the input data signal DQ and a pulse of the clock (or data strobe).
Figure 4:
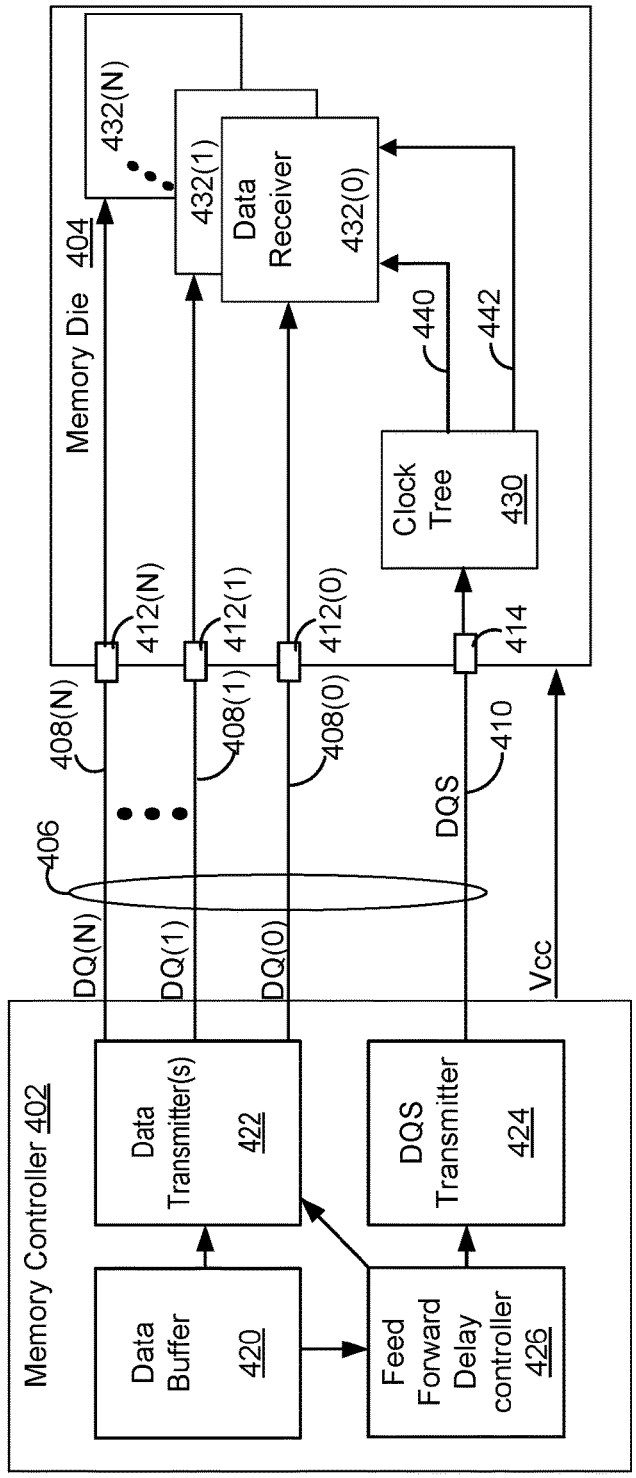
FIG. 4 depicts an embodiment of a memory system having a memory controller and a memory die.

FIG. 4 depicts an embodiment of a memory system having a memory controller 402 and a memory die 404. A communication bus 406 connects the memory controller 402 and memory die 404. The communication bus 406 includes data lines 408(0) to 408(N). The memory die 404 has data contacts 412(0) to 412(N), which are in physical and electrical contact with the respective data lines 408(0) to 408(N). The data contacts 412(0) to 412(N) could be pins, pads, etc. The memory controller 402 is configured to send the data signals DQ(0) to DQ(N) simultaneously and/or in parallel over the data lines 408(0) to 408(N) to the memory die 404. Otherwise stated, the memory die 404 is configured to receive the data signals DQ(0) to DQ(N) simultaneously and/or in parallel from over the data lines 408(0) to 408(N).

In addition, the communication bus 406 includes one or more clock lines 410 between the memory controller 402 and memory die 404. The clock line(s) may also be referred to herein as a data strobe line(s). The signal DQS may be referred to as a data strobe and is used by the receiving side to adjust timing with respect to the data being received on DQ[n:0]. The memory die 404 has one or more clock input contacts 414, which is/are in physical and electrical contact with the respective one or more clock lines 410. The clock input contact(s) could be pins, pads, etc. The input clock signal DQS may include a single-ended clock signal or a pair of complementary clock signals (e.g., DQS and BDQS). The memory die 404 is configured to receive the input clock signal DQS-either as a single-ended clock signal or as a pair of complementary clock signals-simultaneously and/or in parallel with the input of data signals DQ(0) to DQ(N). As an example, there may be eight data lines 408, wherein N is 7. However, there may be more or fewer than eight data lines 408. The DQ signal may contain a command, an address, data transmitted to the memory die 404 for a write, or data transmitted from the memory die 404 for a read, depending on the present usage. FIG. 4 depicts an example of a write in which the memory controller 402 is sending the data signals DQ[n:0] to the memory die 404.

The memory die 404 has a number of data receivers 432(0), 432(1), . . . 432(N). Each data receiver 432 is connected to one of the data lines 408 to receive the data signal transmitted thereon. In an embodiment, each data receiver 432 comprises a sense amplifier based flip flop to receive the DQ signal and latch a result based thereon. A sense amplifier based flip flop provides good performance. However, using a sense amplifier based flip flop on the data in path can lead to a mismatch in delay between the data in path and the data strobe path. Other types of data receivers 432 can also lead to a mismatch in delay between the data in path and the data strobe path.

The memory die 404 has a clock tree 430, which inputs and processes the DQS signal. The clock tree 430 sends timing information to the receivers 432 on clock timing lines 440, 442. In an embodiment, the clock tree 430 outputs two signals to each data receiver 432. A signal transmitted on clock timing line 440 indicates the rising edge of DQS and the signal transmitted on clock timing line 442 indicates the falling edge of DQS. These transitions in DQS may be used to by the data receivers 432 to latch the data. Although a double data rate (DDR) technique is depicted in FIG. 4, a single data rate (SDR) technique may also be used.

The DQS path between the input pad 414 and data receivers 432 passes through the clock tree 430, which results in a delay in providing the rising edge and falling edge signals to the data receivers 432. However, the data in path between the input pads 412 and data receivers 432 has a shorter delay of the DQ signal to the data receivers 432. This difference in delays between the DQS path and DQ paths is referred to as an unmatched system.

The memory controller 402 has data transmitter(s) 422 that are configured to transmit data over the data lines 408. The memory controller 402 has a DQS transmitter 424 that is configured to transmit the DQS signal over the clock line 410. The data transmitter(s) 422 and DQS transmitter 424 may include, but are not limited to, drivers, buffers, amplifiers, transistors, resistors, or other circuit elements configured to drive signals onto a communication bus. The memory controller 402 has a data buffer 420 for temporary storage of data to be transmitted by the data transmitter 422. The memory controller 402 has a feed-forward delay controller 426 that is configured to control the delay between the DQS signal and the DQ signals. In an embodiment, the feed-forward delay controller 426 determines a data dependent delay. For example, the data dependent delay depends on the data in the data buffer 420 that is to be transmitted to the memory die 404. The propagation delay through the clock tree 430 may be impacted by the amount of toggling in the data signals DQ[n:0]. Therefore, by adjusting the delay based on the toggle rate(s) of the data signals DQ[n:0] timing between DQS and DQ[n:0] is improved.

Figure 5:
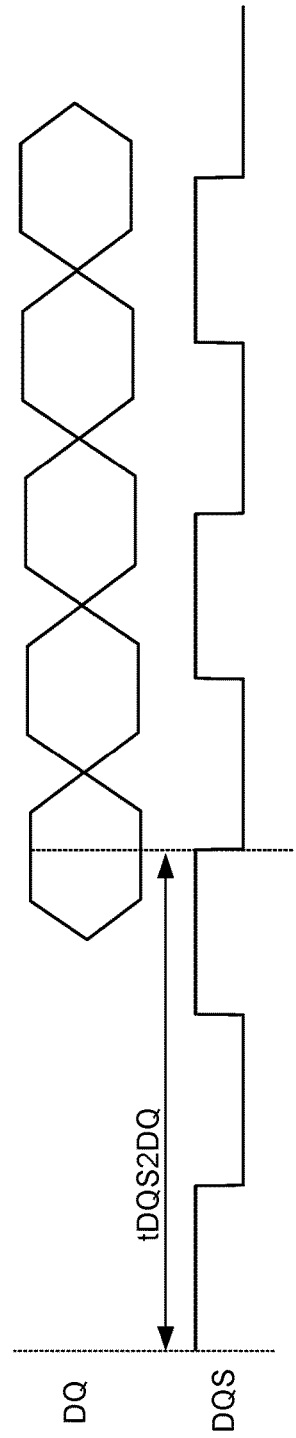
FIG. 5 shows an example data signal (DQ) and an example data strobe signal (DQS), both sent from the memory controller.

FIG. 5 shows an example DQ signal and an example DQS signal, both sent from the memory controller 402. The memory controller 402 delays the DQ signal by the time tDQS2DQ to compensate for the aforementioned mismatch between the DQS path and DQ path on the memory die 404. The memory die 404 identifies levels in the DQ signal in response to detecting transitions of the clock signal DQS. A deviation of the clock transitions from optimal times is referred to as skew between the clock signal and the data signal. Too large of skew between the clock signal and data signals may cause the memory die 404 to incorrectly identify the levels of the data pulses in DQ.

In an embodiment, the feed-forward delay controller 426 increases or decreases tDQS2DQ based on a number of toggles of data in the data buffer 420. Stated another way, the feed-forward delay controller 426 increases or decreases tDQS2DQ based on toggle rates in DQ[n:0]. A toggle refers to a transition in the data in, or to be sent on, one of the data lines 408. Thus, the term "toggle" may apply to the data in the data buffer 420 that is to be sent to the memory die 404. The transition may either be a "high" to "low" transition or a "low" to "high" transition. A toggle in the data buffer 420 may be from "1" to "0" or from "0" to "1". The toggle rate is defined here as the number of toggles in a data signal per clock period. In a DDR example, the toggle rate could be as high as 200%. In an SDR example, the toggle rate could be as high as 100%.

The toggling of the data signals during transmission to the memory die 404 impacts power level. The toggling may impact a voltage level such as Vcc, which is provided from the memory controller 402 to the memory die 404. A higher number of toggles (or higher toggle rate) corresponds to a greater power consumption due to signal transmission. The toggling of the data signals therefore impacts the propagation delay of DQS through the clock tree 430. Referring back to FIG. 4, a change in the propagation delay of DQS through the clock tree 430 therefore reduces timing margin. The feed-forward delay controller 426 compensates for the changes in the propagation delay of DQS based on toggling rate of data to be transmitted.

Figure 6:
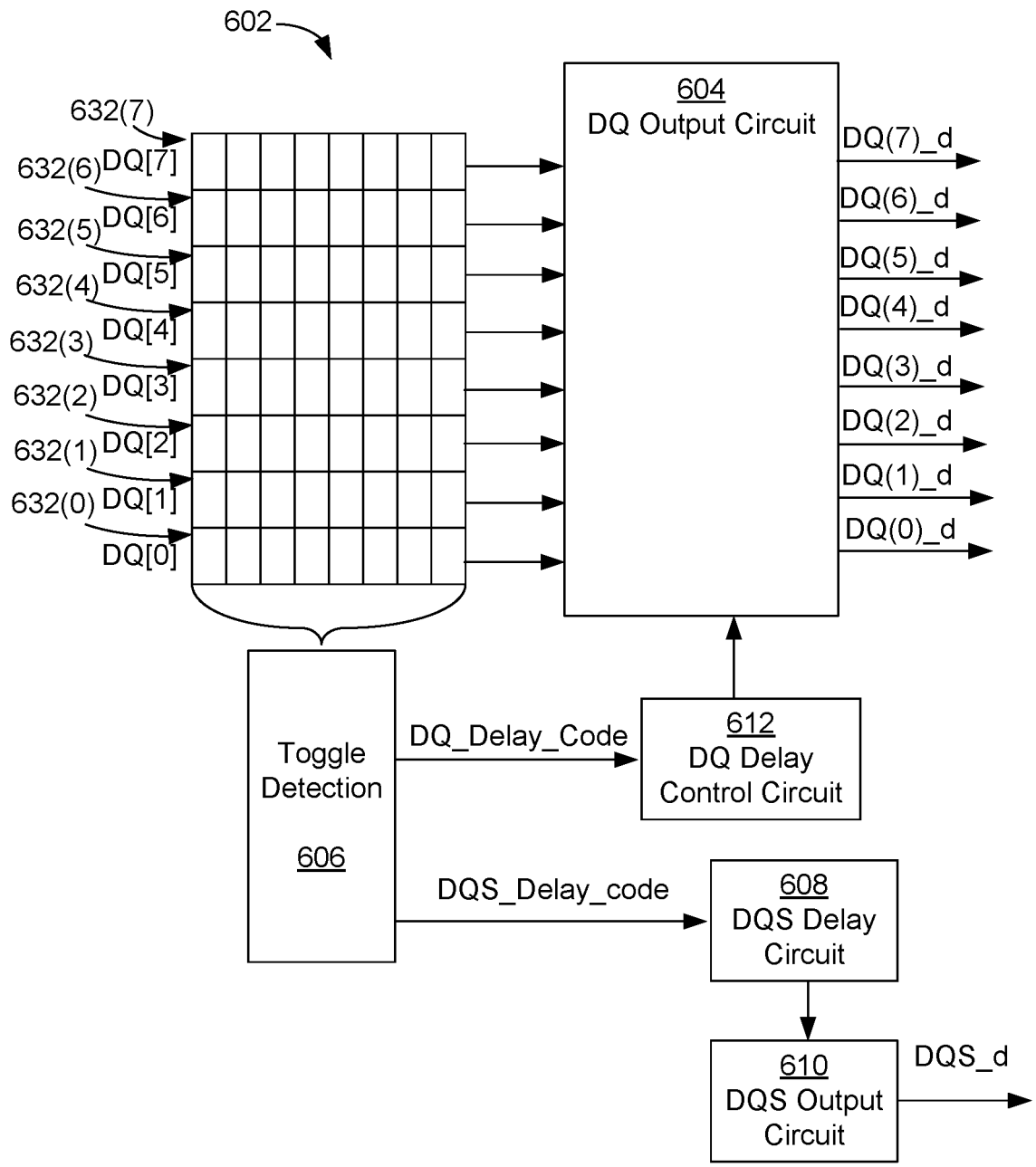
FIG. 6 is a block diagram of one embodiment of components within a memory controller that are used for transmitting a data signal and a data strobe signal.

FIG. 6 is a block diagram of one embodiment of components within a memory controller 402 that are used for transmitting data signals and a data strobe signal. The first-in-first-out (FIFO) data register 602 serves as a data buffer to temporarily store data that is to be transmitted by the DQ output circuit 604. The data signals that are transferred over the communication bus are formed from the data in the FIFO data register 602. The FIFO data register 602 is one embodiment of data buffer 420 (see FIG. 4). In this example, the output data includes eight data signals DQ[7] . . . . DQ[0]. There may be more or fewer than eight data signals. The FIFO data register 602 has eight different lines 632(0), 632(1), 632(2), 632(3), 632(4), 632(5), 632(6), 632(7) in this example, corresponding to the eight data signals (DQ[0], DQ[1], DQ[2], DQ[3], DQ[4], DQ[5], DQ[6], DQ[7]). The data is stored in binary format ("0" or "1") in the FIFO data register 602.

The toggle detection 606 detects and counts toggles in the data in the FIFO data register 602. A toggle refers to a transition in the data in one of the data lines 632. The transition may either be a "1" to "0" transition or a "0" to "1" transition. The total number of toggles in one of the data lines 632 will therefore correspond to a toggle rate. In an embodiment, the toggle detection 606 determines the total number of transitions of all of the lines 632 in the FIFO data register 602 and adjusts the delay between DQS and DQ[n:0] accordingly. The data in the FIFO data register 602 is the data that will be transferred to the memory die 404 over a window of time. Thus, the toggle detection 606 may determine the total number of toggles for all of DQ[n:0] for the window of time. The total number of toggles for all of DQ[n:0] for the window of time will therefore correspond to an average toggle rate of the data signals DQ[n:0].

The toggle detection 606 determines one or more delay codes in order to adjust the delay between DQS and the DQ signals. Therefore, tDQS2DQ(see FIG. 5) may be adjusted based on the toggle rates of DQ[n:0] to adjust the delay from DQS to DQ. The toggle detection 606 determines one or more skew compensation codes. The skew compensation codes may include a code to adjust the delay of DQS and/or a code to adjust the delay of DQ. In an embodiment, DQS_Delay_code is a skew compensation code to adjust the delay of DQS. DQS_Delay_code is provided to the DQS delay circuit 608 in order to control the delay of DQS. The DQS output circuit 610 outputs the DQS signal in accordance with the target delay (DQS_d). The DQS delay circuit 608 may include a digital delay line.

Alternatively, or in addition, the DQ signals may be delayed to control the delay between DQS and DQ. In an embodiment, DQ_Delay_code is a skew compensation code to adjust the delay of DQ. DQ_Delay_code is provided to the DQ delay circuit 612 in order to control the delay of DQ. The DQ output circuit 604 outputs the DQ signals in accordance with the target delay (e.g., DQ(0)_d, etc.). The DQ delay circuit 612 may include a digital delay line. Note that each DQ signal may have its own delay amount based on, for example, write training. In an embodiment, this delay determined based on write training is adjusted based on the DQ_Delay_code. However, it is not required that the DQ_Delay_code be used to compensate for data dependent jitter. Instead the data dependent jitter can be compensated for by adjusting the delay in the DQS signal.

The delay control signals DQS_Delay_code and DQ_Delay_code may be analog signals or digital signals. For configurations in which the delay control signals are digital signals, the delay control signals may be digital codes. Each digital code may represent a p-bit binary number, where p is the number of digits of the p-bit binary number, and where each digit can be a logic 0 value or a logic 1 value. The given configurable delay circuit (608, 612) may respond to the digital code by delaying its respective DQS or DQ signal by a delay amount that corresponds to the current value of the p-bit number represented by the digital code.

The toggle detection 606, DQS delay circuit 608, and DQ delay circuit 612 are included in one embodiment of the feed-forward delay controller 426. The term control circuit may include, but is not limited to, feed-forward delay controller 426, toggle detection 606, DQS delay circuit 608, and/or DQ delay circuit 612. The feed-forward delay controller 426, toggle detection 606, DQS delay circuit 608, and DQ delay circuit 612 may comprise hardware, firmware (or software), or a combination of hardware and firmware (or software). For example, these elements may include or be a component of an integrated circuit (IC), such as an application specific integrated circuit (ASIC) or a field programmable gate array (FPGA), a circuit, a digital logic circuit, an analog circuit, a combination of discrete circuits, gates, or any other type of hardware or combination thereof. In addition, or alternatively, these elements may include memory hardware that comprises instructions executable with a processor or processor circuitry to implement one or more of the features of a circuit that performs feed-forward delay control as described.

Figure 7:
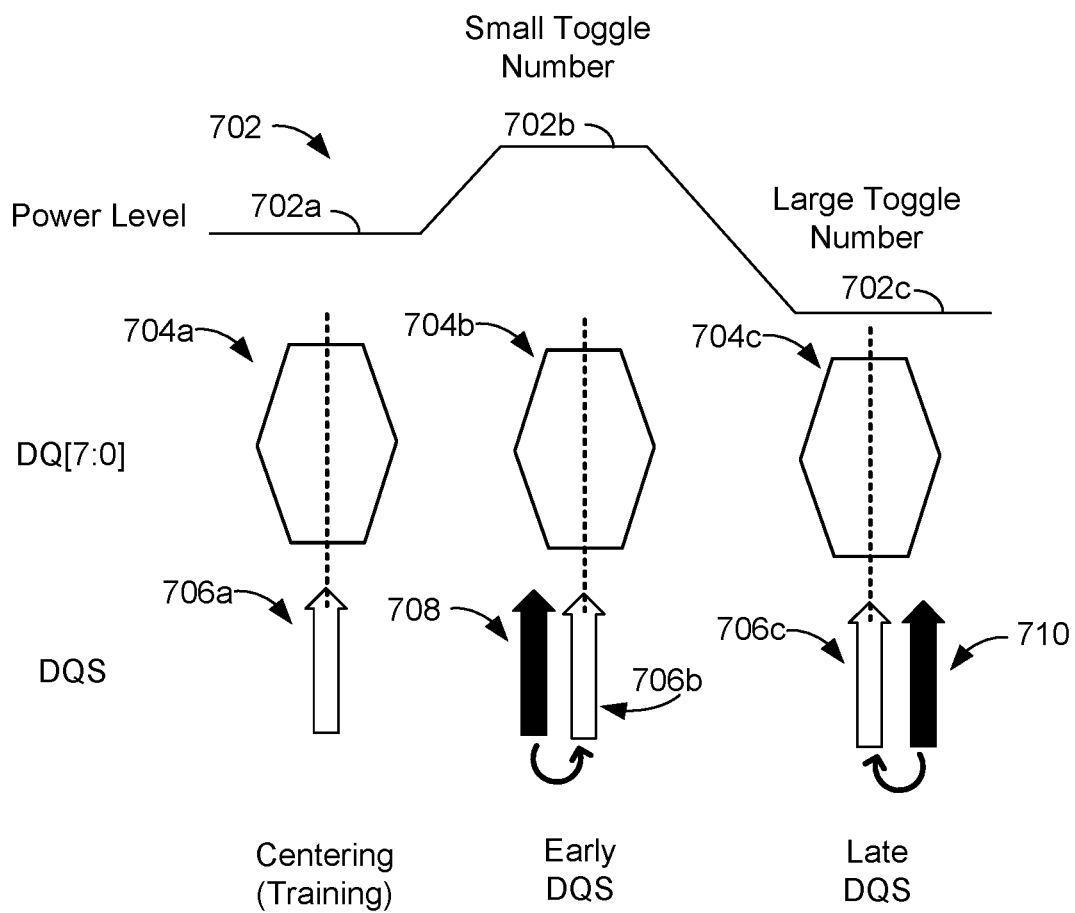
FIG. 7 is a diagram that shows one possible way in which power levels may impact skew.

As discussed herein, there may be data dependent jitter that leads to skew. FIG. 7 is a diagram that shows one possible way in which power levels may impact skew. Plot 702 depicts a power level associated with transmitting the data signals from the memory controller 402 to the memory die 404. The plot 702 covers three cases. The power level is at its highest when the total number of toggles in the data signals (e.g., DQ[n:0]) is small (see region 702b). Here, the number of toggles refers to the total number of toggles over a time window, which correlates to toggle rate. The power level is at its lowest when the total number of toggles in the data signals (e.g., DQ[n:0]) is high (see region 702c). The power level is at an intermediate level when the total number of toggles in the data signals (e.g., DQ[n:0]) is neither low nor high (see region 702a).

Three example data eyes 704a, 704b, 704c are depicted. Arrow 706a represents an edge (transition) of the DQS signal being centered in the data eye 704a during training. Arrow 708 represents the DQS signal being early relative to data eye 704b when the number of toggles is low (and hence power is high). The memory controller 402 adjusts the delay in DQS to center an edge (transition) of the DQS signal with respect to the data eye 704b, as indicated by arrow 706b. Arrow 710 represents the DQS signal being late relative to data eye 704c when the number of toggles is high (and hence power is low). The memory controller 402 adjusts the delay in DQS to center an edge (transition) of the DQS signal with respect to the data eye 704c, as indicated by arrow 706c.

Figure 8:
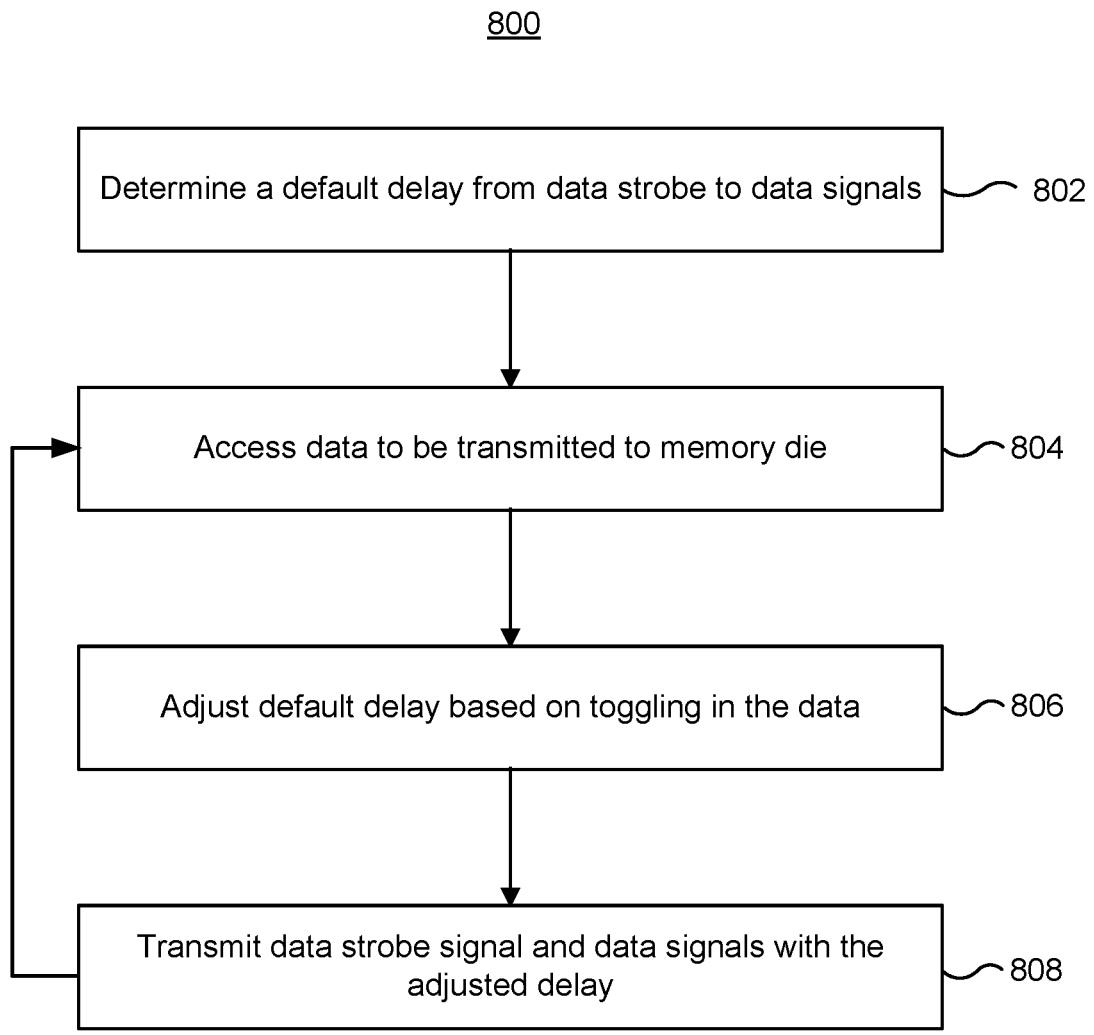
FIG. 8 is a flowchart of one embodiment of a process of data dependent adjustment of the delay between a data strobe signal and a data signal.

FIG. 8 is a flowchart of one embodiment of a process 800 of data dependent adjustment of the delay between a data strobe signal and data signals. Step 802 includes determining a default delay from a data strobe signal to data signals. In an embodiment, step 802 is performed during a write training process between the memory controller 402 and the memory die 404. In an embodiment, the memory controller 402 determines a value for the parameter tDSQ2DQ(see FIG. 5). The memory controller 402 may determine a suitable delay code such as DQS_delay_code. The memory controller 402 may also determine individual delay codes for each data line to compensate for differences in each respective data path.

Steps 804 to 808 may be performed when sending data to the memory die 404 to be written in storage cells on the memory die 404. Step 804 includes accessing data to be transmitted to the memory die. The data is to be transmitted over a window of time from a memory controller to a memory die. In an embodiment, the data is the data to be included in data signals such as DQ[n:0]. Step 804 may include accessing the data in the FIFO data register 602.

Step 806 includes adjusting the default delay based on toggling in the data to be transmitted to the memory die 404. Step 806 may include determining one or more delay parameters based on a number of toggles in the data. Step 806 may include determining a value for DQS_delay_code and/or DQ_Delay_code. In an embodiment, the memory controller 402 determines the total number of toggles in DQ[n:0] over some window of time (such as the data in the FIFO data register 602). As discussed the toggles over a time window correlates to a toggle rate. The total toggles in the FIFO data register 602 will correlate to an average toggle rate for the data signals DQ[n:0]. Therefore, it may be stated that the one or more delay parameters are determined based on toggle rate or average toggle rate. The adjustment to the delay could be performed with each new data sample, but is not required to be performed that frequently. For example, the toggle detection logic 606 could perform a "sliding window" calculation in which as new data samples are added to the FIFO data register 602 the toggling number is constantly updated.

Step 808 includes transmitting the data strobe signal and the data signals with the adjusted data. Note that the data signals are formed from the data that was analyzed for the amount of toggling. Thus, this may be referred to as a "feed-forward" technique in the delay may be based entirely, or at least primarily, on data that is to be transmitted in the future. However, depending on the update rate of the toggle count it is possible that the delay is based to some small extent on toggling of data presently being transmitted, or even data that has already been transmitted. In an embodiment, the delay is adjusted by the DQS delay circuit 608, which adjusts the delay in DQS based on, for example, DQS_delay_code. In an embodiment, the delay is adjusted by the DQ delay circuit 612, which adjusts the delay in one or more of the DQ signals based on, for example, DQ_delay_code. In an embodiment, the DQ delay circuit 612 will adjust the delay in each of the DQ signals DQ[n:0] by the same amount based on the DQ_delay_code.

FIGS. 9A and 9B depict tables to show examples of how toggling in the data (or toggle rate) may correlate to power consumption. Table 900 in FIG. 9A is for a relatively low power example. Table 950 in FIG. 9B is for a relatively high power example. Tables 900 and 950 each have a row for each of the eight data signals DQ[7:0]. The values in the last column in each table 900, 950 show the number of toggles for each respective row. The number of toggles in row correlates to toggle rate. For table 900, column 902 is the next data to be transmitted and column 904 is the last data to be transmitted for this window of time. For table 950 column 952 is the next data to be transmitted and column 954 is the last data for this window of time. In these examples, a toggle is defined as either a transition from "0" to "1" or as a transition from "1" to "0". In table 900, the row for DQ7 has two toggles, the row for DQ6 has two toggles, the row for DQ5 has zero toggles, etc. The total number of toggles in table 900 is 12, in this example. In table 950, the row for DQ7 has eight toggles, the row for DQ6 has eight toggles, the row for DQ5 has eight toggles, etc. The total number of toggles in table 950 is 64, in this example. The relatively low number of toggles in table 900 results in lower power consumption. The relatively high number of toggles in table 950 results in higher power consumption. The examples in FIGS. 9A sand 9B are for purpose of illustration. The window of time over which the toggle is computed may be larger or smaller (i.e., more or fewer data samples). Also note that the FIFO data register 602 may be a different size than tables 900, 950.

Figure 10:
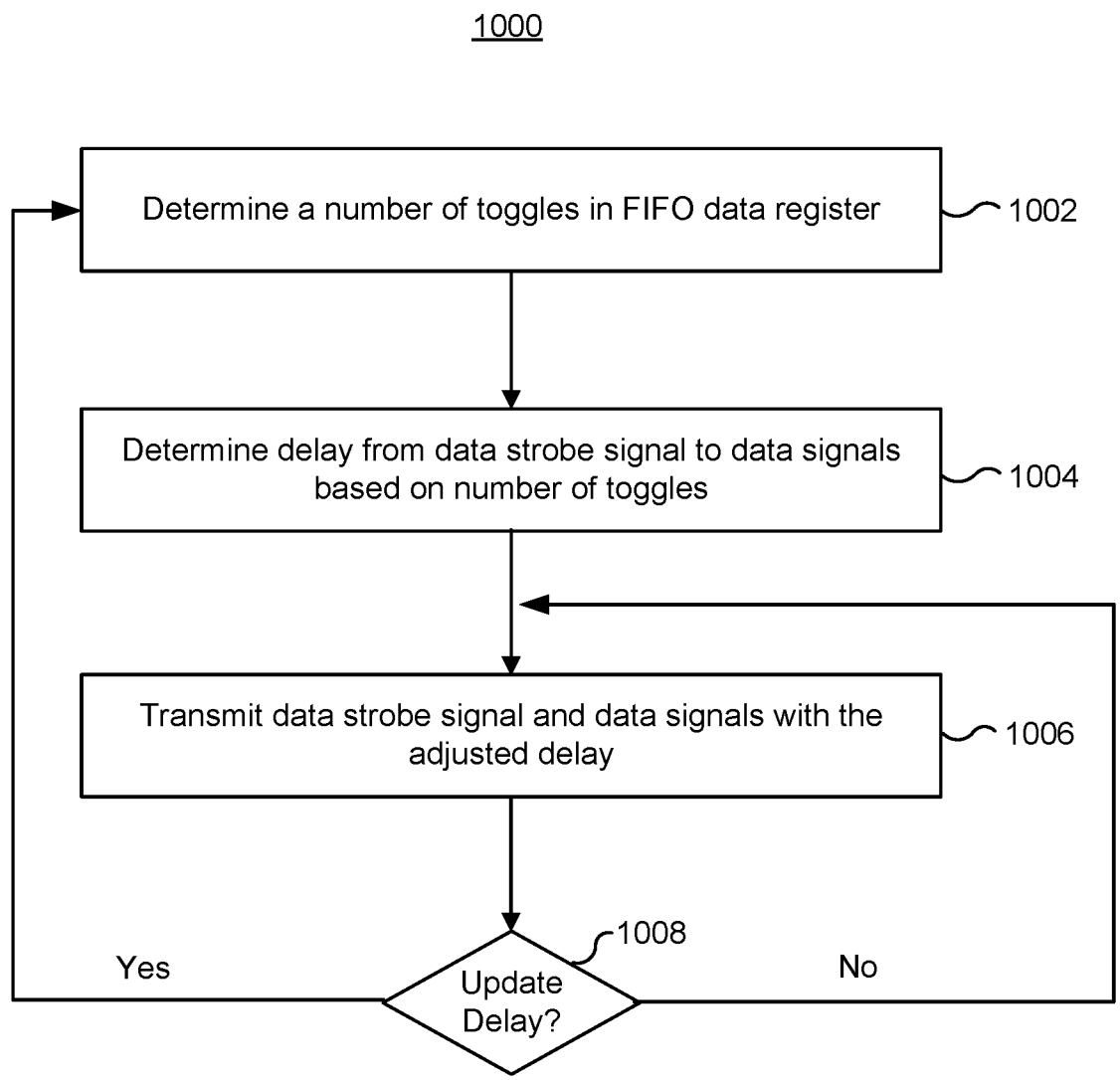
FIG. 10 is a flowchart of one embodiment of a process of adjustment of the delay between a data strobe signal and a data signal based on data in a data buffer.

FIG. 10 is a flowchart of one embodiment of a process 1000 of data dependent adjustment of the delay between a data strobe signal and data signals. Process 1000 provides further details for an embodiment of steps 804-808 in FIG. 8. Step 1002 includes determining a number of toggles in the FIFO data register 602. With reference to an example in FIG. 9A, there are 12 toggles in the example FIFO data register 602. With reference to an example in FIG. 9B, there 64 12 toggles in the FIFO data register 602.

Step 1004 includes determining a delay from the data strobe signal to the data signals based on a number of toggles in the data. In an embodiment, step 804 may include determining a value for DQS_delay_code.

Step 1006 includes transmitting the data strobe signal and the data signals DQ[n:0] with the adjusted delay. In an embodiment, the delay is adjusted by the DQS delay circuit 608, which adjusts the delay in the DQS signal based on, for example, DQS_delay_code.

Step 1008 is a determination of whether the delay should be updated. If so, the process 1000 then returns to step 1002 to re-calculate the delay. If not, then the memory controller 402 continues to send the data strobe signal and the data signals with the present value of the delay. In an embodiment, the delay is updated with each new data sample to be sent. However, the delay may be updated at a lower frequency.

Figure 11:
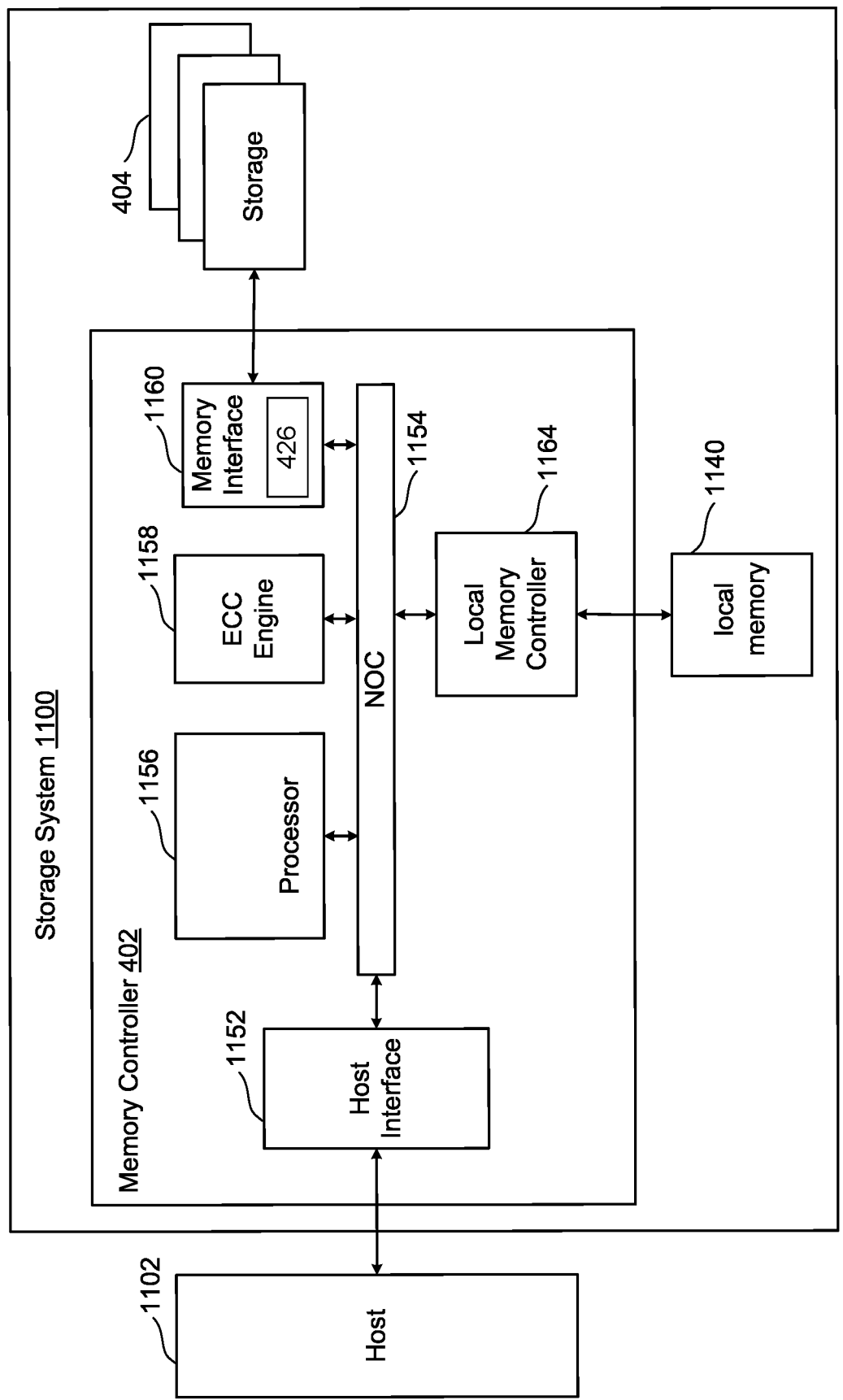
FIG. 11 is a block diagram of one embodiment of a storage system that implements the technology described herein.

FIG. 11 is a block diagram of one embodiment of a storage system 1100 that implements the technology described herein. In one embodiment, storage system 1100 is a solid state drive ("SSD"). Storage system 1100 can also be a memory card, USB drive or other type of storage system. The proposed technology is not limited to any one type of storage system. Storage system 1100 is connected to host 1102, which can be a computer, server, electronic device (e.g., smart phone, tablet or other mobile device), appliance, or another apparatus that uses memory and has data processing capabilities. In some embodiments, host 1102 is separate from, but connected to, storage system 1100. In other embodiments, storage system 1100 is embedded within host 1102.

The components of storage system 1100 depicted in FIG. 11 are electrical circuits. Storage system 1100 includes a memory controller 402 (or storage controller) connected to memory dies 404 and local high speed memory 1140 (e.g., DRAM, SRAM, MRAM). Local memory 1140 is non-transitory memory, which may include volatile memory or non-volatile memory. Local high speed memory 1140 is used by memory controller 402 to perform certain operations. For example, local high speed memory 1140 may store logical to physical address translation tables ("L2P tables").

Memory controller 402 comprises a host interface 1152 that is connected to and in communication with host 1102. In one embodiment, host interface 1152 implements an NVM Express (NVMe) over PCI Express (PCIe). Other interfaces can also be used, such as SCSI, SATA, etc. Host interface 1152 is also connected to a network-on-chip (NOC) 1154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 1154 can be replaced by a bus. Connected to and in communication with NOC 1154 is processor 1156, ECC engine 1158, memory interface 1160, and local memory controller 1164. Local memory controller 1164 is used to operate and communicate with local high speed memory 1140 (e.g., DRAM, SRAM, MRAM).

ECC engine 1158 performs error correction services. For example, ECC engine 1158 performs data encoding and decoding. In one embodiment, ECC engine 1158 is an electrical circuit programmed by software. For example, ECC engine 1158 can be a processor that can be programmed. In other embodiments, ECC engine 1158 is a custom and dedicated hardware circuit without any software. In another embodiment, the function of ECC engine 1158 is implemented by processor 1156.

Processor 1156 performs the various controller memory operations, such as programming, erasing, reading, and memory management processes. In one embodiment, processor 1156 is programmed by firmware. In other embodiments, processor 1156 is a custom and dedicated hardware circuit without any software. Processor 1156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 402 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 1140 cannot hold all of the L2P tables. In such a case, the entire set of L2P tables are stored in a memory dies 404 and a subset of the L2P tables are cached (L2P cache) in the local high speed memory 1140.

Memory interface 1160 communicates with memory dies 404. In one embodiment, memory interface provides a Toggle Mode interface. Other interfaces can also be used. In some example implementations, memory interface 1160 (or another portion of controller 402) implements a scheduler and buffer for transmitting data to and receiving data from one or more memory die. The memory interface 1160 has a feed-forward delay controller 426 in accordance with embodiments disclosed herein.

Figure 12:
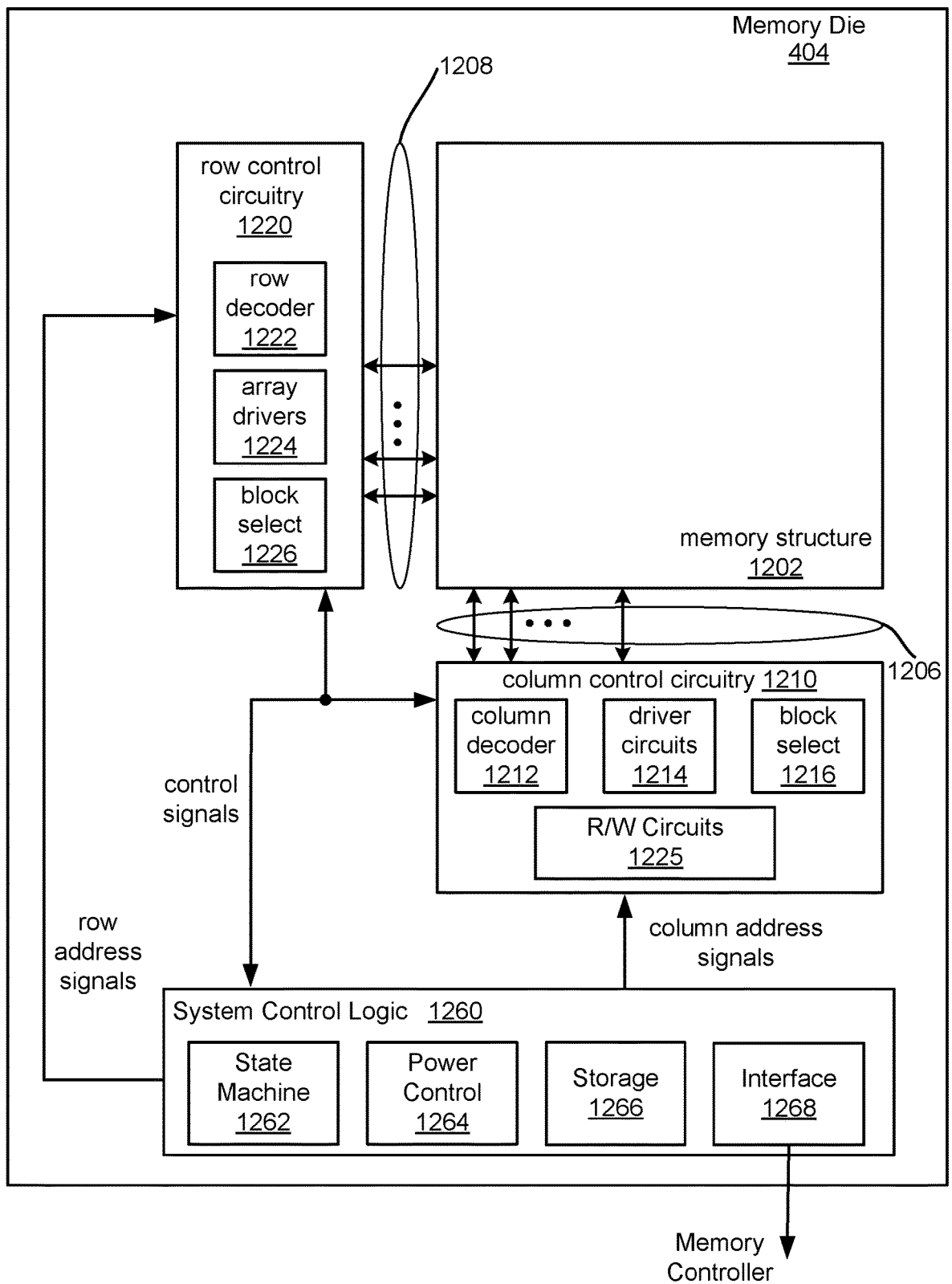
FIG. 12 is a functional block diagram of one embodiment of a memory die.

FIG. 12 is a functional block diagram of one embodiment of a memory die 404. The components depicted in FIG. 12 are electrical circuits. Memory die 404 includes a memory structure 1202 (e.g., memory array) that can comprise non-volatile memory cells (also referred to as non-volatile storage cells), as described in more detail below. The array terminal lines of memory structure 1202 include the various layer(s) of word lines organized as rows, and the various layer(s) of bit lines organized as columns. However, other orientations can also be implemented. Memory die 404 includes row control circuitry 1220, whose outputs are connected to respective word lines of the memory structure 1202. Row control circuitry 1220 receives a group of M row address signals and one or more various control signals from System Control Logic circuit 1260, and typically may include such circuits as row decoders 1222, array drivers 1224, and block select circuitry 1226 for both reading and writing (programming) operations. Row control circuitry 1220 may also include read/write circuitry. Row control circuitry 1220 is coupled to memory structure 1202 through electrical paths 1208. Memory die 404 also includes column control circuitry 1210 including read/write circuits 1225. The read/write circuits 1225 may contain sense amplifiers and data latches. The sense amplifier(s) input/outputs are connected to respective bit lines of the memory structure 1202. Although only single block is shown for structure 1202, a memory die can include multiple arrays that can be individually accessed. Column control circuitry 1210 receives a group of N column address signals and one or more various control signals from System Control Logic 1260, and typically may include such circuits as column decoders 1212, array terminal receivers or driver circuits 1214, block select circuitry 1216, as well as read/write circuitry, and I/O multiplexers. Column control circuitry 1210 is coupled to memory structure 1202 through electrical paths 1206. The system control logic 1260, column control circuitry 1210, and/or row control circuitry 1220 are configured to control memory operations such as open block reads at the die level.

System control logic 1260 receives data and commands from memory controller 402 and provides output data and status to the host. In some embodiments, the system control logic 1260 (which comprises one or more electrical circuits) includes state machine 1262 that provides die-level control of memory operations. In some embodiments, the state machine 1262 prevents over-erase of NAND strings in the memory structure 1202. In one embodiment, the state machine 1262 is programmable by software. In other embodiments, the state machine 1262 does not use software and is completely implemented in hardware (e.g., electrical circuits). In another embodiment, the state machine 1262 is replaced by a micro-controller or microprocessor, either on or off the memory chip. System control logic 1260 can also include a power control module 1264 that controls the power and voltages supplied to the rows and columns of the memory structure 1202 during memory operations. System control logic 1260 includes storage 1266 (e.g., RAM, registers, latches, etc.), which may be used to store parameters for operating the memory structure 1202.

Commands and data are transferred between memory controller 402 and memory die 404 via memory controller interface 1268 (also referred to as a "communication interface"). Memory controller interface 1268 is an electrical interface for communicating with memory controller 402. Examples of memory controller interface 1268 include a Toggle Mode Interface and an Open NAND Flash Interface (ONFI). Other I/O interfaces can also be used. The memory controller interface 1268 includes a data in path and a data strobe path, which may be unmatched as has been discussed herein. The data strobe path may include clock tree (see clock tree 430, FIG. 4). An embodiment of the feed-forward delay controller 426 adjusts the delay between DQS and DQ based on the number of toggles (or toggle rate) in the data being transmitted from the memory controller 402 to the memory die 404.

In some embodiments, all the elements of memory die 404, including the system control logic 1260, can be formed as part of a single die. In other embodiments, some or all of the system control logic 1260 can be formed on a different die than the die that contains the memory structure 1202.

In one embodiment, memory structure 1202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 1202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 1202 is not limited to the examples above. Many different types of memory array architectures or memory technologies can be used to form memory structure 1202. No particular non-volatile memory technology is required for purposes of the new claimed embodiments proposed herein. Other examples of suitable technologies for memory cells of the memory structure 1202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 1202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

In view of the foregoing, it can be seen that an embodiment includes, an apparatus comprising a data transmitter configured to transmit data signals over a communication bus to a memory die, a data strobe transmitter configured to transmit a data strobe signal over the communication bus to the memory die, and a control circuit in communication with the data transmitter and the data strobe transmitter. The control circuit is configured to determine a delay between the data strobe signal and first data signals to be transmitted over the communication bus to the memory die based on an amount of toggling in data to be transmitted in the first data signals. The control circuit is configured to control the data transmitter and the data strobe transmitter to transmit the data strobe signal and the first data signals to the memory die with the delay between the data strobe signal and the first data signals.

In a further embodiment, the apparatus comprises a first-in-first-out (FIFO) data register configured to hold data to be transmitted over the communication bus. The control circuit is configured to determine a number of toggles in the data in the FIFO data register, form the first data signals from the data in the FIFO data register, and control the delay between the data strobe signal and the first data signals based on the number of toggles in the data in the FIFO data register.

In a further embodiment, the FIFO data register comprises a separate line for each of a plurality of data lines in the communication bus, and the number of toggles in the data in the FIFO data register comprises a total number of toggles of each line in the FIFO data register.

In a further embodiment, the communication bus comprises a plurality of data lines, the data transmitter is configured to transmit each data signal over a different data line of the plurality of data lines, and the control circuit is configured to: determine a separate toggle rate for each data signal of the first data signals; and adjust the delay between the data strobe signal and the second data signals based on an average toggle rate of the first data signals.

In a further embodiment, the memory die has a data in path configured to receive and process the data signals from the data transmitter. The memory die has a data strobe path configured to receive and process the data strobe signal from the data strobe transmitter. The data in path and the data strobe path are unmatched. The control circuit is configured to determine a default delay between the data strobe signal and second data signals transmitted to the memory die in a write training process. The delay between the data strobe signal and the first data signals is an adjustment to the default delay.

In a further embodiment, the data strobe path has a longer delay than the data in path. The control circuit is configured to provide data dependent delay from the data strobe signal to data signals transmitted to the memory die. The data dependent delay depends on toggling of the data in the data signals transmitted to the memory die.

In a further embodiment, the control circuit is configured to compensate for data dependent power consumption of transmitting the second data signals across the communication bus to the memory die by adjusting the delay from the data strobe signal to the first data signals.

In a further embodiment, the control circuit is configured to increase the delay between the data strobe signal and the first data signals responsive to the amount of toggling in the data to be transmitted over the communication bus to the memory die being below a threshold.

In a further embodiment, the control circuit is configured to decrease the delay between the data strobe signal and the first data signals responsive to the amount of toggling in the data to be transmitted over the communication bus to the memory die being above a threshold.

An embodiment includes a method for operating a memory system. The method comprises accessing data to be transmitted over a window of time in at least one data signal from a memory controller to a memory die. The method comprises determining a number of transitions over time in the data. The method comprises controlling a delay between a data strobe signal and the at least one data signal based on the number of transitions. The method comprises transmitting the data strobe signal and the at least one data signal from the memory controller to the memory die with the controlled delay.

An embodiment includes a memory system comprising a communication bus, a memory die coupled to the communication bus, and a memory controller coupled to the communication bus. The memory controller is configured to determine a number of toggles in data to be transmitted over the communication bus to the memory die over a time window. The memory controller is configured to form data signals from the data. The memory controller is configured to determine a delay from a data strobe signal to the data signals based on the number of toggles. The memory controller is configured to transmit the data strobe signal and the data signals over the communication bus to the memory die with the delay from the data strobe signal to the data signals.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
a data transmitter configured to transmit data signals over a communication bus to a memory die;
a data strobe transmitter configured to transmit a data strobe signal over the communication bus to the memory die; and
a control circuit in communication with the data transmitter and the data strobe transmitter, the control circuit configured to:
determine a delay between the data strobe signal and first data signals to be transmitted over the communication bus to the memory die based on an amount of toggling in data to be transmitted in the first data signals; and
control the data transmitter and the data strobe transmitter to transmit the data strobe signal and the first data signals to the memory die with the delay between the data strobe signal and the first data signals.

2. The apparatus of claim 1, further comprising a first-in-first-out (FIFO) data register configured to hold data to be transmitted over the communication bus, wherein the control circuit is configured to:
determine a number of toggles in the data in the FIFO data register;
form the first data signals from the data in the FIFO data register; and
control the delay between the data strobe signal and the first data signals based on the number of toggles in the data in the FIFO data register.

3. The apparatus of claim 2, wherein:
the FIFO data register comprises a separate line for each of a plurality of data lines in the communication bus; and
the number of toggles in the data in the FIFO data register comprises a total number of toggles of each line in the FIFO data register.

4. The apparatus of claim 1, wherein:
the communication bus comprises a plurality of data lines;
the data transmitter is configured to transmit each data signal over a different data line of the plurality of data lines; and
the control circuit is configured to:
i) determine a separate toggle rate for each data signal of the first data signals; and
ii) adjust the delay between the data strobe signal and the first data signals based on an average toggle rate of the first data signals.

5. The apparatus of claim 1, wherein:
the memory die has a data in path configured to receive and process the data signals from the data transmitter;
the memory die has a data strobe path configured to receive and process the data strobe signal from the data strobe transmitter, wherein the data in path and the data strobe path are unmatched; and
the control circuit is configured to determine a default delay between the data strobe signal and second data signals transmitted to the memory die in a write training process, the delay between the data strobe signal and the first data signals is an adjustment to the default delay.

6. The apparatus of claim 5, wherein:
the data strobe path has a longer delay than the data in path; and
the control circuit is configured to provide data dependent delay from the data strobe signal to data signals transmitted to the memory die, wherein the data dependent delay depends on toggling of the data in the data signals transmitted to the memory die.

7. The apparatus of claim 1, wherein the control circuit is configured to:
compensate for data dependent power consumption of transmitting the first data signals across the communication bus to the memory die by adjusting the delay from the data strobe signal to the first data signals.

8. The apparatus of claim 7, wherein the control circuit is configured to:
increase the delay between the data strobe signal and the first data signals responsive to the amount of toggling in the data to be transmitted over the communication bus to the memory die being below a threshold.

9. The apparatus of claim 7, wherein the control circuit is configured to:
decrease the delay between the data strobe signal and the first data signals responsive to the amount of toggling in the data to be transmitted over the communication bus to the memory die being above a threshold.

10. A method for operating a memory system, the method comprising:
accessing data to be transmitted over a window of time in at least one data signal from a memory controller to a memory die;
determining a number of transitions over time in the data;
controlling a delay between a data strobe signal and the at least one data signal based on the number of transitions; and
transmitting the data strobe signal and the at least one data signal from the memory controller to the memory die with the controlled delay.

11. The method of claim 10, wherein:
the at least one data signal comprise a plurality of data signals;
determining the number of transitions over time in the data to be transmitted over the window of time comprises determining a number of transitions for each of the plurality of data signals over the window of time; and
adjusting the delay between the data strobe signal and the at least one data signal based on the number of transitions comprises adjusting the delay between the data strobe signal and the plurality of data signals based on a total number of transitions in the plurality of data signals over the window of time.

12. The method of claim 10, wherein accessing the data to be transmitted over the window of time comprises accessing data in a first-in-first-out (FIFO) data register configured to hold the data to be transmitted from the memory controller to the memory die.

13. The method of claim 10, wherein adjusting the delay between the data strobe signal and the at least one data signal comprises compensating for data dependent power consumption of transmitting the data from the memory controller to the memory die.

14. The method of claim 10, further comprising:
processing the at least one data signal in a data in path at the memory die;
processing the data strobe signal in a clock path at the memory die; and adjusting the delay between the data strobe signal and the at least one data signal based on the number of transitions comprises compensating for data dependent propagation delay differences between the data in path and the clock path.

15. A memory system comprising:
a communication bus;
a memory die coupled to the communication bus; and
a memory controller coupled to the communication bus, wherein the memory controller is configured to:
  determine a number of toggles in data to be transmitted over the communication bus to the memory die over a time window;
  form data signals from the data;
  determine a delay from a data strobe signal to the data signals based on the number of toggles; and
  transmit the data strobe signal and the data signals over the communication bus to the memory die with the delay from the data strobe signal to the data signals.

16. The memory system of claim 15, wherein:
the communication bus comprises a plurality of data lines;
the memory controller is configured to:
  determine a separate number of toggles in the data to be transmitted over each respective data line of the plurality of data lines over the time window; and
  determine the delay from the data strobe signal to the data signals based on a total number of toggles of the data to be transmitted over the plurality of data lines over the time window.

17. The memory system of claim 16, further comprising:
a first-in-first-out (FIFO) data register, the FIFO data register comprises a separate line for each of the plurality of data lines, wherein the memory controller is configured to:
  determine a separate number of toggles in the data in each respective line in the FIFO data register; and
  determine the delay from the data strobe signal to the data signals based on a total number of toggles in the lines in the FIFO data register.

18. The memory system of claim 15, wherein:
the memory die comprises a data in path configured to process the data signals from the memory controller, the memory die having a data strobe path configured to process the data strobe signal, wherein the data in path and the data strobe path are unmatched; and
the memory controller is configured to determine the delay from the data strobe signal to the data signals to compensate for data dependent differences in propagation delays of the data in path and the data strobe path.

19. The memory system of claim 15, wherein the memory controller is configured to increase the delay from the data strobe signal to the data signals in response to the number of toggles being below a threshold.

20. The memory system of claim 15, wherein the memory controller is configured to decrease the delay from the data strobe signal to the data signals in response to the number of toggles being above a threshold.

* * * * *